(No Model.)
C. BIRKERY.
BALL COCK.
No. 537,267. Patented Apr. 9, 1895.
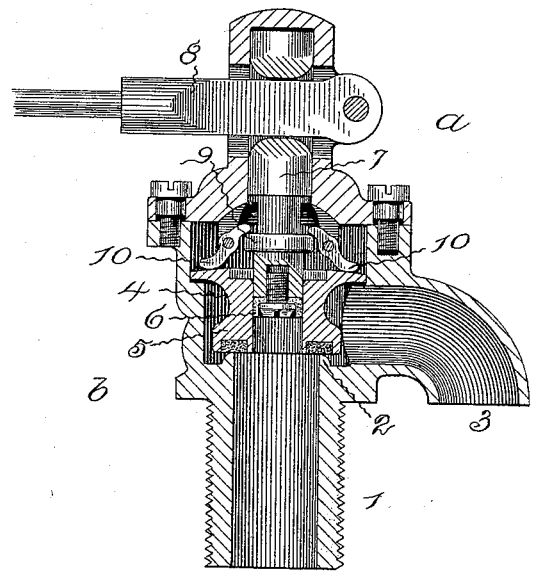
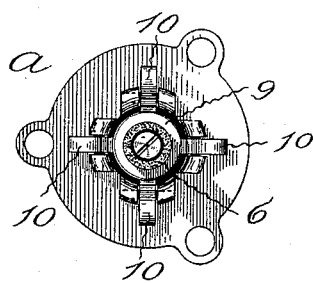
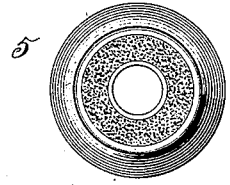
Witnesses:
C. E. Buckland.
E. J. Hyde.
Inventor:
Cornelius Birkery, by
Harry P. Williams
atty.

UNITED STATES PATENT OFFICE.

CORNELIUS BIRKERY, OF HARTFORD, CONNECTICUT, ASSIGNOR TO THE BIRKERY MANUFACTURING COMPANY, OF SAME PLACE.

BALL-COCK.

SPECIFICATION forming part of Letters Patent No. 537,267, dated April 9, 1895.

Application filed April 28, 1894. Serial No. 509,303. (No model.)

*To all whom it may concern:*

Be it known that I, CORNELIUS BIRKERY, a citizen of the United States, residing at Hartford, in the county of Hartford and State of Connecticut, have invented certain new and useful Improvements in Ball-Cocks, of which the following is a specification.

The invention relates to the class of balanced ball cocks that open with and close against the pressure of the water; and the object is to provide a simple, cheap and durable ball cock of this class that is so constructed that it may have a large water-way and yet may be opened with and tightly closed against high or varying pressures evenly and surely by a small float without any singing, hissing or hammering.

Referring to the accompanying drawings: Figure 1 is a longitudinal section of the cock. Fig. 2 is a view of the inside face of the upper part of the casing with the balancing piston, and Fig. 3 is a face view of the closing disk or valve.

In the form of cock shown in the views, the casing is made in two parts, $a$ and $b$, that are held together by screws, but these parts, of course, if desired, could be threaded and screwed together as is common with cocks of this class. The part $b$ has an inlet through a hub 1 that is threaded for attachment to a supply pipe, with a seat 2 at the end of the inlet and an outlet bib 3 opening from the valve or disk chamber 4. In this chamber is a loosely supported valve disk or block 5, provided with any suitable packing, that is adapted to reciprocate in the chamber from or to the seat to open or close the cock to the passage of water.

The valve disk or block has a central perforation in which fits a piston 6 that may be formed on or secured to the end of the spindle 7, or it may move loosely in the perforation in such manner as to only make contact with the end of the spindle. This spindle is loosely supported by a hub on the part $a$ of the casing and is connected with the float lever 8 which is pivoted to the shell and adapted to be connected with any common form of ball or float so that when the float lever oscillates under the rise and fall of the float the spindle and the piston are reciprocated. The spindle 7 is preferably provided with a collar or shoulder 9, and in engagement with this shoulder are any suitable number of short levers 10 that are so pivoted to parts of the casing in the interior of the valve chamber that their ends engage with the back face of the valve block or disk 5 as well as with the shoulder on the spindle.

When the water is emptied from a tank or reservoir provided with a cock of this construction, the float drops and this causes the float lever to push downward the spindle with its shoulder and piston. This movement of the spindle relieves the ends of the little levers by moving away the shoulder with which they engage so that the levers, which can then freely oscillate, will not exert any pressure against the back of the valve. The valve thus relieved from the pressure of the levers is free to move away from the seat under the pressure of the water at the inlet and allow a clear passage for the water through the cock from the inlet to the bib. As the water which escapes from the outlet bib fills the tank or reservoir, the rising float or ball, by means of the float lever, draws the spindle up so that the collar or shoulder will again engage the ends of the little levers and oscillate them in such manner that they will force the valve to its seat and thus close the cock. This upward movement of the spindle which is accomplished by the float is much aided and facilitated by the pressure of the water on the piston in the central opening of the valve, and as the valve closes and the pressure of the water on the valve increases with a tendency to open it, the pressure, of course, also increases on the piston and more strongly forces the piston upward, which upward pressure on the piston is communicated through the levers to the back of the valve to aid in holding it close to its seat against the pressure.

This construction provides a simple, cheap and durable cock which balances itself under all pressures so that while the waterway may be quite large for the passage of a considerable quantity of water and the valve disk exposed to heavy pressures, it will shut easily and tightly under the influence of a small float without any singing, hissing or hammering.

I claim as my invention—

1. In combination with a cock casing having an inlet, an outlet, and a seat between the inlet and outlet, a valve formed in two parts both facing the waterway, said parts being located with relation to each other so that when the balancing part moves away from the port the valve part moves toward the port, substantially as specified.

2. In combination with a cock casing having an inlet, an outlet and a seat between the inlet and outlet, a valve formed in two parts, one having an annular face and the other a circular face filling the opening in the annular face, said parts being connected so that when the inner one moves from the seat port the outer moves toward the seat, substantially as specified.

3. A cock having a casing with an inlet, an outlet and a seat between the inlet and outlet, a valve movable toward and from the seat, a float spindle movably held by the casing, said spindle having a part exposed to the pressure, and levers pivoted to the casing and engaging with the spindle and the valve, substantially as specified.

4. A cock having a casing with an inlet, an outlet and a seat between the inlet and outlet, a valve movable toward and from the seat, a float spindle movably held by the casing, a part of the spindle being exposed to the pressure, and parts connecting the spindle with the valve, substantially as specified.

5. A cock having a casing with an inlet, an outlet and a seat between the inlet and outlet, a valve movable toward and from the seat, said valve having a central perforation, a piston movable in the valve perforation, a float spindle connected with the piston, and levers engaging the valve and adapted to be moved by the reciprocation of the spindle, substantially as specified.

6. A cock having a casing with an inlet, an outlet and a seat between the inlet and outlet, a perforated valve movable toward and from the seat, a float spindle provided with a piston movable in a perforation in the valve and exposed to the pressure, and levers pivoted to the casing, said levers engaging the valve and a portion of the spindle, substantially as specified.

CORNELIUS BIRKERY.

Witnesses:
HARRY R. WILLIAMS,
E. J. HYDE.